United States Patent [19]

Rousseau et al.

[11] 3,853,845

[45] Dec. 10, 1974

[54] 5-N-AMINOACYL-5-AMINOURIDINES

[75] Inventors: Robert J. Rousseau, Laguna Niguel; Roland K. Robins, Santa Ana; George A. Ivanovics, Costa Mesa, all of Calif.

[73] Assignee: ICN Pharmaceutical, Inc., Irving, Calif.

[22] Filed: Aug. 18, 1971

[21] Appl. No.: 172,922

[52] U.S. Cl......... 260/211.5 R, 260/112.5, 424/180
[51] Int. Cl............................................. C07d 51/52
[58] Field of Search.................. 260/211.5 R, 112.5

[56] References Cited
UNITED STATES PATENTS

| | | | |
|---|---|---|---|
| 2,710,860 | 6/1955 | Ruskin | 260/211.5 R |
| 3,089,869 | 5/1963 | Mauvernan et al. | 260/221.5 R |
| 3,155,647 | 11/1964 | Dutcher et al. | 260/211.5 R |
| 3,208,997 | 9/1965 | Iwai et al. | 260/211.5 R |
| 3,308,117 | 3/1967 | Kelly et al. | 260/211.5 R |

*Primary Examiner*—Johnnie R. Brown
*Attorney, Agent, or Firm*—Lyon & Lyon

[57] ABSTRACT

Described herein are a novel class of compounds useful as antiviral agents, i.e., 5-N-aminoacyl-5-aminouridines and 5-N-di-peptidyl-5-aminouridines. Also described are a variety of novel synthetic routes by which the subject compounds may be obtained, variously including reaction of 5-aminouridine or its glycosyl hydroxyl-blocked analog with appropriately amino-blocked amino acids or amino acid halides.

10 Claims, No Drawings

5-N-AMINOACYL-5-AMINOURIDINES

FIELD OF THE INVENTION

This invention relates to compounds having amino acids or peptides bound to amino nitrogen of 5-aminouridine, and to processes of preparing the same.

BACKGROUND OF THE INVENTION

5-Aminouridine was first prepared by Roberts and Visser J. Biol. Chem. 194, 695 (1952) and the compound was later reported to exhibit antiviral activity, Visser et al Proc. Soc. Exp. Biol. Med. 79, 571 (1952). The compound has been shown to be metabolized to 5-amino-UMP, 5-amino-UDP, 5-amino-UTP and 5-amino-UDP-sugars, suggesting its involvement in numerous metabolic pathways as a potential biosynthesis interferant in, for example, virus nucleic acid synthesis. However, 5-aminouridine has also been observed to reduce incorporation of phosphates in phospholipids and to exhibit other properties indicative of inherent cytotoxicity, for which reason the potential clinical utility of the compound is severely diminished. Accordingly, it would be advantageous to secure compounds having antiviral activity like that of 5-aminouridine, albeit with lesser degrees of cytotoxicity.

Reasons for the study and synthesis of nucleoside peptides as possible medicinal agents are set out in Robins et al, J. Am. Chem. Soc. 93, 1471 (1971). In brief, amino acids have been shown to be bound at undetermined points to acid-insoluble yeast RNA and to highly purified DNA. While the biochemical role of these amino acids is undetermined, DNA-bound peptides have been suggested to act as "derepressors" of structural genes in protein synthesis, and shown in a specific instance to be more numerous in tumors than in the non-malignant tissues studied.

Robins et al, supra, report the effect on cell-free protein synthesis of various 5'-deoxy-5'-amino-5'-N-aminoacyl peptide derivatives of guanosine, adenosine, and 2'-deoxyadenosine, and note the earlier preparation of "guanosine propionic acid," a naturally occurring nucleoside derivative of alanine in which that amino acid is covalently bound to the 2-position of the purine ring system, i.e., N-(9-β-D-ribofuranosyl-purin-6-on-2-yl) alainine.

Amino acids have previously been bound to form 4-N-aminoacyl cytosine nucleosides, Stevens et al, J. Org. Chem. 31, 4014 (1966) and Sokolova et al, Z. Obsh. Khim. 33, 2480 (1963), and pyrimidin-4-yl amino acid nucleosides are discussed in Ueda and Fox J. Med. Chem. 6, 697 (1963). In addition, several bioactive amino acid nucleosides containing peptidyl groups on the glycosyl moiety have been prepared. However, while the bioactivity of 5-alanyluracil is suggested by its isolation from germinating pea seeds, Brown and Silver Biochim. Biophys. Acta 119, 1 (1966), until this point no literature reference whatsoever has been made to 5-N-aminoacyl-pyrimidines or -pyrimidine nucleosides.

BRIEF SUMMARY OF THE INVENTION

According to this invention, there are provided 5-N-aminoacyl-5-aminouridines and 5-N-di-peptidyl-5-aminouridines exhibiting antiviral properties and other such compounds which may serve as intermediates in the preparation of the antiviral agents. Also provided are methods for the production of such compounds, alternatively comprising reaction of the appropriate nucleoside with an amino-blocked amino acid halide, or with an amino-blocked amino acid in the presence of a carbodiimide coupling agent. The nucleosidic peptides are similarly obtained, preferably by further reaction of the 5-N-aminoacyl compounds with amino acids or amino acid halides. There is further provided by the invention a novel manner of selectively blocking the nucleosidic reactant employed in the carbodiimide method.

Active compounds produced according to this invention were superior to 5-aminouridine itself in inhibiting one or more of Herpes, Parainfluenza and Rhino viruses on KB monolayers, while at the same time most of the compounds exhibited reduced cytotoxicity relative to 5-aminouridine.

DETAILED DESCRIPTION OF THE INVENTION

By this invention, amino acid moeities are acylbound to the amino nitrogen of 5-aminouridine, viz:

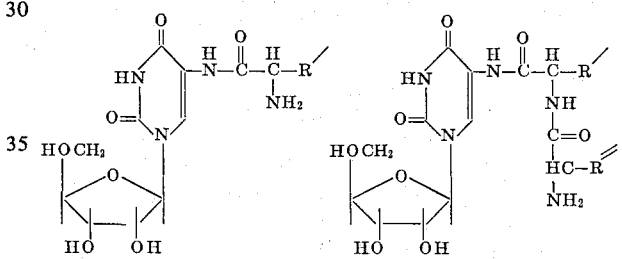

a. 5-N-Aminoacyl-5-Aminouridine
b. 5-N-di-Peptidyl-5-Aminouridine where R' and R" are the characteristic functions of the particular amino acid. In structure (b), the R"-amino acid is referred to as the amino-terminal amino acid moiety whereas the R'-amino acid is the carbonyl-terminal amino acid moiety. Only L-amino acids are employed herein and, as appears from structures (a) and (b), they are the α-amino acids. For convenience, these are implied herein in referring to compounds as, e.g., 5-N-di-peptidyl nucleosides rather than the more formal 5-N-di-α-L-di-peptidyl nucleosides, etc.

The methods of the invention will be discussed with reference to the following diagram of preferred embodiments, in which the acid halide method for 5-N-aminoacyl derivatives involves steps I and II, while the carbodiimide method involves steps IV – VIII. Preferably, 5-N-dipeptidyl compounds are secured by further employment of one or the other of those methods, i.e., by methods comprising steps III or IX.

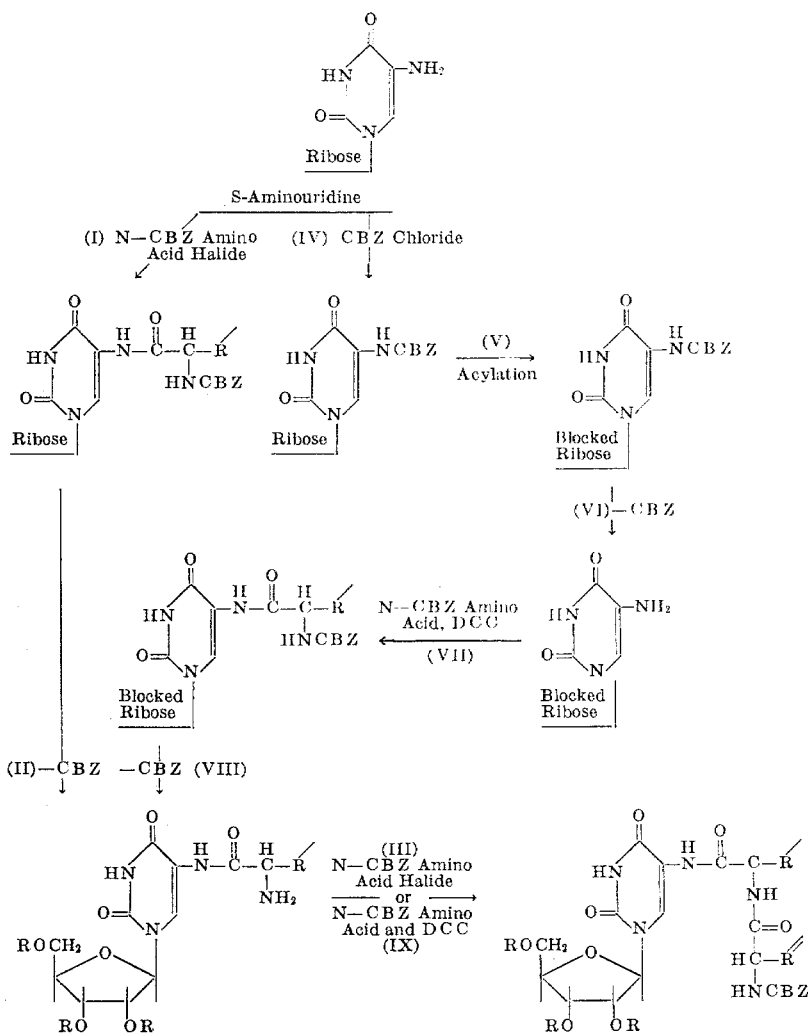

In the foregoing diagram, R' and R" are as above defined. In the cases depicted, R is hydrogen by the amino acid halide route or a glycosyl hydroxyl-blocking group resulting from step IV of the carbodiimide route. Glycosyl hydroxyl-blocking is critical in the latter route, and may be taken advantage of even in the acid halide preparation simply to enhance solubility of riboside intermediates in reaction media.

In Robins et al, supra, the active ester method of Bodanszky J. Am. Chem. Soc. 5688 (1959) is utilized to couple an amino group of a nucleoside to amino acids in the presence of free hydroxyl groups. However, when we treated N-CBZ-aminoacid p-nitrophenyl esters with 5-aminouridine no detectable product formation occurred. This was surprising, since while, e.g., 6-amino in adenine is electronegative and hence relatively inert to acylation, 5-amino in 5-amino-uridine is electron-rich, and by reason of this high nucleophilicity would have been expected to acylate readily by the Bodanszky method. When the phosphazo method, Goldschmidt et al Chem. Ber. 86, 1116 (1953) was resorted to, low yields complicated by numerous side products resulted. On the other hand, large yields without major side products were obtained by reaction of 5-aminouridine with an amino-blocked amino acid halide (step I).

Thus, treatment of the N-CBZ derivative of L-Phe. with DMF-SOCl$_2$ at low temperature and reaction of the resulting acid chloride with 5-aminouridine afforded 5-N-(N-CBZ-L-Phe)-5-aminouridine (compound 1). Similarly, the L-ala (2), L-leu (3) and L-gly (4) 5-N(N-CBZ-amionacyl)-5-aminouridine derivatives were facilely obtained in large yield by the acid halide method, and catalytic hydrogenolysis with palladium on carbon (step II) provided the deblocked 5-N-aminoacyl nucleosides (respectively, compounds 1a – 4a) in excellent yield.

The preferred amino-blocking reagent is an aryloxy or t-alkoxy carbonyl compound activated in the reaction media by the presence of a leaving group such as halogen or azide, e.g., carbonylbenzyloxy chloride and its halo, methoxy, amino or nitro-substituted analogs, etc., t-butoxycarbonyl chloride, t-butoxycarbonyl azide, etc. Alternatively, there may be employed, e.g., acetic anhydride, acetyl halide, etc. The purpose of the blocking group, of course, is to prevent self-reaction of the amino acid halides.

While preferred for reactions with amino acids such as those above mentioned, L-isoleucine, L-valine, etc., the acid halide method is not universally advantageous due to the sensitivity of same amino acids to halogenating reagents, e.g., L-lysine may form a polymerizable anhydride, the hydroxyl of L-hydroxyproline may be halogenated, L-aspartic acid may form its diacid halide, etc., all leading to reduced yields of desired product. On the other hand, our carbodiimide method, never previously employed to attack nucleosidic amino functions in the formation of aminoacyl nucleosides, may be advantageously employed with any amino acid.

In the case of carbodiimide method glycosyl hydroxyl groups must be protected against involvement in the carbodiimide-activated aminoacid coupling reaction, as by acylation or benzylation. The preferred coupling agent, dicyclohexylcarbodiimide (DCC) is generally water-insoluble, so that in this case the coupling reaction is run in non-aqueous solvents in which 5-aminouridine is insoluble. However, the glycosyl hydroxyl-blocking groups afford the requisite nucleosidic solubility in organic media. Acylation is the preferred blocking method, and may be employed to provide, e.g., $C_1$–$C_{18}$ acyl blocking groups, preferably acetyl or benzoyl groups. The 5-amino group of the nucleoside must be available for amino acid reaction, yet has been found to be more susceptible to acylation than the glycosyl hydroxyls. We accordingly first block the 5-amino group against later reaction with the glycosyl hydroxyl blocking reagent by treating the 5-aminouridine in step IV with an aryloxy- or t-alkoxy carbonyl blocking reagent under conditions disfavoring reaction of that agent with glycosyl hydroxyls, i.e., in solution buffered to $p^H$ greater than about 8. Thereafter, glycosyl hydroxyl groups are blocked (step V), the 5-amino-blocking group removed (step VI) and coupling had with an appropriately amino-blocked amino acid (step VII). Again, the amino groups of the amino acids are blocked to prevent self-reaction, as with CBZ or others of the agents discussed above. Where more than a single amino group is contained in a particular amino acid, of course, convenience may dictate simultaneous use of differing blocking groups, e.g., L-arginine is preferably first nitrated, then reacted with CBZ halide to form N -CBZ-N -nitro-L-arg for participation in the coupling reaction. In appropriate cases, other vulnerable amino acid functions are also conventionally protected, e.g., with aspartic acid the $\beta$-carboxyl group is converted to the methyl ester. In such cases, the amino acid moiety present in the end product may be determined by choice of deblocking reagent. Thus, treatment of the methyl ester with aqueous base provides the 5-N-(L-Asp) nucleoside, whereas reaction with methanolic ammonia yields 5-N-(L-Asn)-5-aminouridine. Similarly, choice of deblocking reagent may alternatively afford aminoacyl nucleosides containing L-Glu or L-Gln moieties, etc.

The carbodiimide coupling agents are hydrophilic in the sense of "taking up" water formed in the condensation reaction of the blocked nucleoside and the amino-blocked amino acid. For example, DCC is converted to dicyclohexylurea in course of reaction. Where water soluble byproducts are required for ease of extractive removal, other carbodiimide coupling agents such as N-ethyl, N'-(p-dimethyl-aminopropyl) carbodiimide and N-cyclohexyl-N'-[2-morpholinyl-(4)-ethyl] carbodiimide metho-p-toluene sulfonate may be used. N-hydroxy-succinimide may be employed to accelerate carbodiimide coupling. Following coupling step VII, the amino-blocking group or groups are removed as earlier discussed and glycosyl hydroxyl blocking groups may be removed or preserved for further reaction of the blocked aminoacyl nucleoside to form the 5-N-peptidyl nucleosides of the invention.

The peptide nucleosides may be formed according to III or IX in fashions similar to that discussed above, step IX being preferred. Thereafter, of course, deblocking proceeds as before. Alternatively, appropriately blocked dipeptides may be reacted directly with the product of step VI, the corresponding acid halides reacted directly with 5-aminouridine as in step 1, etc. It will be appreciated as well that dipeptides may be similarly reacted with the aminoacyl nucleosides resulting from steps II or VIII to form 5-N-tripeptidyl-5-aminouridines, etc.

In the following examples of preferred embodiments of the invention, individual method steps are numbered for convenience as in the foregoing description. Other than as specifically indicated above, reaction conditions are those conventionally employed in this art, emphasis being laid on low temperatures to avoid cleavage of the glycosyl band, racemization, etc. Preferably, the coupling reactions are carried out at temperatures at or less than about 0°C.

EXAMPLES 1-4

Acid Halide Preparation of 5-N-$\alpha$-Aminoacyl-5-Aminouridines (I.) Preparation of 5-N-(N-CBZ-aminoacyl)-5-Aminouridines In each case, the appropriate N-CBZ-amino acid (1.0 mmole) was treated with 119 mg of $SOCl_2$ in 4 ml of DMF at −20°C. The reaction mixt was protected from moisture during 1 hr at −5° to −8°C, then added to a mixture of 284 mg (1.1 mmole) of 5-aminouridine and 222 mg (2 mmoles) triethylamine in 5 ml of DMF at −20°C. The triethylammonium chloride which precipitated was removed by filtration. The filtrate was evapd to a syrup in vacuo. The syrup was triturated with a 1:1 mixture of EtOAc:$Et_2O$ then with water. The resulting solid was collected and recrystallized from the appropriate solvent, as given in Table I along with analyses for the particular compounds. Where analysis are indicated only by symbols of the elements of functions, analytical results obtained for those elements or functions were within ± 0.4% of the theoretical values.

TABLE I

| Compound | Aminoacyl | Recrystallization Solvent | Anal. | Yield |
|---|---|---|---|---|
| 1 | L-phenylalanyl | MeOH | C,H,N | 82% |
| 2 | L-alanyl | 95% EtOH | do. | 73% |
| 3 | L-leucyl | EtOAc | do. | 67% |
| 4 | L-glycyl | MeOH | do. | 87% |

(II.) Removal of CBZ Group by Catalytic Hydrogenolysis

The calculated weight of the CBZ protected compounds prepared by method I dissolved in the appropriate solvent (Table II) was hydrogenated with 50 mg of 10% Pd on C at atmospheric pressure and room temp. After 2 hours the catalyst was removed by filtration, washed with $H_2O$(3×5 ml) and the combined filtrates were evaporated to dryness in vacuo and recrystallized in yields reported below in Table II.

TABLE II

| 5-N-α-Aminoacyl-5-Aminouridine Compound-Hydrogenation Solvent | Amino-Acyl | Recrystallization Solvent | Anal. | Yield |
|---|---|---|---|---|
| 1a-1 mmole in 8 ml 85% EtOH | L-phe | $H_2O$ | C,H,N | 86% |
| 2a-0.443 mmoles in 10 ml 90% EtOH | L-ala | 95% EtOH | do. | 72% |
| 3a-0.39 mmoles in 6 ml 95% EtOH | L-leu | EtOH | do. | 82% |
| 4a-0.445 mmoles in 10 ml 60% dioxane | L-gly | EtOH-$H_2O$ | do. | 93% |

EXAMPLE 5

Preparation of 5-N-α-(L-Lysyl)-5-Aminouridine
(IV.) 5-N-CBZ-5-Aminouridine (5a)

A rapidly stirred solution of 5-aminouridine (2.58 g, 10 mmoles) and sodium carbonate (0.74 g, 7 mmoles) in 30 ml water was treated with a solution of benzylchloroformate (1.87 g. 11 mmoles) in 10 ml $Et_2O$ at 0°C. After the addition was complete the cooling bath was removed and the stirring was continued at room temperature for 3 hours. The white product which was collected by filtration was triturated with $Et_2O$ (50 ml), water (50 ml), and then recrystallized from MeOH to yield 3.06 g of 5a (77%), mp 192°–193°C, $[\alpha]_D^{25} = -33.3°$ (c = 1, DMSO).
Anal. Calcd. for $C_{17}H_{19}N_3O_8$: C,H,N.
(V.) 5-N-CBZ-(2′,3′,5′-Tri-O-Acetyl)-5-Aminouridine (5b)

Compound 5a (1.65 g, 3.09 mmoles) was treated with a mixture of $AC_2O$ (15 ml) and pyridine (10 ml) at room temperature. After 2 hours the solution was evaporated to dryness in vacuo and the residue was crystallized from absolute EtOH to yield 1.92 g (96%) of 4b, mp 149°–150°C, $[\alpha]_D^{25} = -28.3°$ (c = 1, DMSO).

Anal. Calcd. for $C_{23}H_{25}O_{11}N_3$: C,H,N.
(VI.) 2′,3′,5′-Tri-O-Acetyl-5-Aminouridine (5c)

Compound 5b (1.6 g, 3.08 mmoles) was dissolved in 50 ml 95% EtOH and hydrogenated with 200 mg 10% Pd on carbon at room temperature and atmospheric pressure. After 2.5 hours the catalyst was removed by filtration washed with 95% ethanol (3 × 20 ml) and the combined filtrates were evaporated to dryness. The product was recrystallized from methanolwater to yield 1.030 g (87%), mp 66°–68°C, $[\alpha]_D^{25} = 30.8°$ (c = 1, DMSO).
Anal. calcd. for $C_{15}H_{19}N_3O_9$: C,H,N.
(VII.) 5-N-(N ,N -$D_i$-CBZ-L-Lysyl)-2′,3′,5′-Tri-O-Acetyl-5-Aminouridine (5d)

A cold solution of compound 5c (1340 mg, 3.5 mmoles) and N N -dicarbobenzoxyl-L-lysine (1235 mg, 3 mmoles) in 10 ml EtOAc was treated with DCC (720 mg, 3.5 mmoles). After 48 hours at 4°C the precipitated dicyclohexyurea was removed by filtration and the filtrate was washed with 5% citric acid, 5% $NaHCO_3$ then water. The solvent was removed under reduced pressure and the residual glass was purified by chromatography on a column (2.4 × 30 cm) packed with Silica Gel, "Baker" in chloroform. The column was washed with chloroform (300 ml) and the product was eluted with $CHCl_3$—EtOAC 1:1. The combined uv absorbing fractions were evaporated to dryness to given an amorphous, white material to yield 1.78 g (76%), $[\alpha]_D^{25} = -41.5°$ (c = 1, DMSO).
Anal. Calcd. for $C_{37}H_{43}N_5O_{14}$: C,H,N.
(VIII.) 5-N-(L-Lysyl)-5-Aminouridine (5e)

Compound 5d (570 mg, 0.73 mmoles) was dissolved in 20 ml of absolute EtOH containing 1 ml of HOAc and hydrogenated with 10% of Pd on carbon (80 mg) at 45°C and atmospheric pressure. After 2 hours the catalyst was removed by filtration, washed with EtOH and evaporated to dryness in vacuo. The residual glass was treated with 50 ml of saturated methanolic $NH_3$ at 0°C and then the solution was kept at room temperature for 16 hours. The solvent was removed under reduced pressure. The residue was dissolved in a small amount of water and applied to a column of Dowex 50 [$H^+$] 50 - 100 mesh 1.5 × 25 cm. After washing the column with water (300 ml) the product was eluted with 1N $NH_4OH$. The uv absorbing fraction was collected and evaporated to a small volume. EtOH was added to the residue until incipient turbidity, then this mixture was allowed to cool to −4°C for several hours and white crystals deposited to yield 282 mg (54%), mp 138–140°C, $[\alpha]_D^{25} = -58.5°$ (c = 1, $H_2O$).
Anal. Calcd. for $C_{15}H_{25}O_7N_5$: C,H,N.

EXAMPLES 6–7

5-N-(L-Asparaginyl)-5-aminouridine and 5-N-(L-aspartyl)-5-aminouridine, respectively compounds 6 and 7, are prepared by selective deblocking reactions with 5-N-(N-CBZ-β-O-methyl-L-aspartyl)-2′,3′,5′-tri-O-acetyl-5-aminouridine, i.e., after removal of the CBZ blocking group, reaction with methanolic ammonia yields compound 6, while alternatively reaction in aqueous base provides compound 7. The precursor compound is obtained by method VII as follows. A solution of N-CBZ-L-aspartic acid-β-methyl ester (1.405 g, 5 mmoles) obtained by the method of Schwartz et al, J. Amer. Chem. Soc. 79, 5697 (1957) and compound 5c (2.304 g, 6 mmoles) in EtOAc (25 ml) was treated with DCC (1440 mg, 1 mmoles) at 0°C. After 4 hours at room temperature and 16 hours at 4°C the N,N′-dicyclohexylurea was removed by filtration and the filtrate was washed with 5% citric acid, 5% $NaHCO_3$ and then $H_2O$. The solvent was removed under reduced pressure and the residue was dissolved in a small amount of $CHCl_3$ and applied to a column of Silica Gel "Baker" 2.5 × 30 cm, packed in $CHCl_3$. The column was washed first with $CHCl_3$ (1000 ml) and then the product was eluted with $CHCl_3$—EtOAc 2:1. The uv absorbing fractions were collected and evaporated to a small volume. Petroleum ether was carefully added to these fractions and a colorless crystalline material deposited to yield 2.760 g (85%) of the blocked precursor, mp 67°–69°C $[\alpha]_D^{25} = -61.7°$ (c = 1, DMSO).
Anal. Calcd. for $C_{28}H_{32}N_4O_{14}$: C,H,N.
5-N-(L-Asparaginyl)-5-aminouridine (6)

A solution of the blocked precursor prepared above (1.296 g, 2 mmoles) in 95% EtOH (50 ml) was hydrogenated with 100 mg of 10% Pd on C at 40°C and atmospheric pressure. After 2 hours the catalyst was removed by filtration and the filtrate was evaporated to dryness in vacuo. Half of the residue was preserved for an alternative work-up (see compound 3f). The other half was treated with saturated methanolic ammonia (40 ml) at 0°C. After 16 hours at 4°C the solvent was removed under reduced pressure and the residue was crystallized from EtOH—H$_2$O to yield 258 mg (66%) of 6, mp 135°–137°C, $[\alpha]_D^{25}$ = 9.0° (c = 1, N HCl).
Anal. Calcd. for C$_{13}$H$_{19}$O$_8$N$_9$.H$_2$O: C,H.N.

5-N-(L-Aspartyl)-5-aminouridine (7)

The amount of crude precursor 5-N-($\beta$-O-methyl-L-aspartyl)-2',3',5'-tri-O-acetyl-5-aminouridine which was preserved at the previous procedure (see compound 6) was treated with anhydrous MeOH (30 ml) containing 80 mg of NaOMe. After the solution was refluxed for 15 minutes, then kept at room temperature for 4 hours, the solvent was removed under reduced pressure. H$_2$O (8 ml) was added and the solution was kept at 4°C for an additional 16 hours, percolated through a column of Amerlite IR 50 [H$^+$] 100–200 mesh and then evaporated to a small volume. The residue was kept at 4°C for 16 hours and colorless crystals deposited to yield 221 mg (58%) of product, mp 203°–206°C, $[\alpha]_D^{25}$ = –8.3° (c = 1, N HCl).
Anal. Calcd. for C$_{13}$H$_{18}$O$_9$N$_4$.1.5 H$_2$O: C,H.N.

EXAMPLE 8

5-N-(N-CBZ-L-phenylalanyl) 2',3',5'-Tri-O-Acetyl-5-Aminouridine (8)

Simply to demonstrate another fashion in which compound 1a prepared above may be obtained, the amino- and glycosyl hydroxyl-blocked precursor therefore was prepared according to method VIII with DCC and the N-CBZ-blocked amino acid.

Compound 5c (1.21 g; 31 mmoles) and N-CBZ-L-phenylalanine (1.036 g; 34 mmoles) were dissolved in EtOAC (10 ml). The solution was treated with DCC (0.707 g; 34 mmoles) at 0°C then stirred at room temperature for 18 hours. The dicyclohexyurea was removed by filtration and the filtrate was washed respectively with 5 percent citric acid, 5% HCl, H$_2$O, 5% NaHCO$_3$, and H$_2$O then dried over anhydrous Na$_2$SO$_4$. The solvent was evaporated under reduced pressure and the residue was crystallized from Et$_2$O-n-Heptane to yield 1.26 g (61%) mp 71°–73°C $[\alpha]_D^{25}$ = 34.7° (c = 1; DMSO).

The blocking groups may be removed from compound 8 to obtain compound 1a. Alternatively, advantage may be taken of the fact of glycosyl hydroxyl blocking in the dipeptide synthesis of Example 9.

EXAMPLE 9

5-N-(L-Asparaginyl-L-phenylalanyl-5-Aminouridine (9d)
5-N-(L-Phenylalanyl)2',3',5'-tri-O-acetyl-5-aminouridine hydrobromide salt (9a)

Compound 8 (665 mg; 1 mmole) was dissolved in EtOAc (1.5 ml) and the solution was treated with 35% HBr in HOAc (0.6 g; 2.6 mmoles) at room tempeature. After 1 hour Et$_2$O (3.5 ml) was added and colorless crystalline product separated to yield 573 mg (94%) of 9a, mp 112°–114°C.

(IX.) 5-N-[N-CBZ-L-($\beta$-O-methyl-L-asparatyl)-L-phenylalanyl]-2',3',5'-tri-O-acetyl-5-aminouridine (9b)

N-CBZ-L-aspartic acid-$\beta$-methylester (436 mg; 1.55 mmoles) was treated with excess diethylamine (3.0 mmoles) in CH$_2$Cl$_2$ (10 ml). The solvents were removed under reduced pressure and the residue was dissolved in CH$_2$Cl$_2$ (12 ml). Compound 9a (1.468 g; 2.4 mmoles) and DCC (618 mg; 3 mmoles) were added to the solution and it was kept at room temperature for 18 hours. The dicyclohexylurea was removed by filtration and a filtrate was washed with 5% HCl, 5% NaHCO$_3$, and H$_2$O dried over anhydrous Na$_2$SO$_4$. The solution was concentrated to a small column and applied to a column of silica gel, "Baker" 2.5 × 25 cm, packed in CHCl$_3$. The column was washed first with CHCl$_3$ (200 ml) then with CHCl$_3$—Me$_2$CO 10:1. The uv absorbing fractions which were chromotographically homogeneous were combined and evaporated to dryness to yield 820 mg (66%) of 9b as a colorless glass.

5-N-[L-$\beta$-O-Methyl)aspartyl-L-phenlalanyl]-2',3',5'-tri-O-acetyl-5-aminouridine hydrobromide salt (9c)

Compound 9b (800 mg; 1 mmole) was dissolved in EtOAc (6 ml) and was treated with 35% HBr in AcOH (0.8 ml). After 2 hours an additional 0.5 ml of AcOH-HBr was added and the solution was kept at room temperature for 30 minutes. Then Et$_2$O (36 ml) was added slowly and colorless crystalline material deposited to yield 610 mg (82%) of product, mp 118°–120°C, $[\alpha]_D^{25}$ = 14.5 (C = 1; DMSO).

5-N-(L-Asparaginyl-L-phenylalanyl)-5-aminouridine (9d)

Compound 9c (200 mg; 0.27 mmoles) was treated with saturated MeOH-NH$_3$ (10 ml) at room temperature for 18 hours then the solvent was removed under reduced pressure. The residue was dissolved in a small amount of H$_2$O and applied to a column of DOWEX 50 ([H$^+$] form, 100–200 mesh, 1 × 15 cm). The column was washed with H$_2$O then the product was eluted by gradient elution. (150 ml 0.5 N NH$_4$OH, reservoir; 150 ml H$_2$O) mixing chamber. The uv absorbing fractions which were chromatographically homogenous were combined and lyophilized, then dried over P$_2$O$_5$ in vacuo at 60°C to yield 87 mg (62%) of 6c, mp 122°–123°C (174°–175°C dec.), $[\alpha]_D^{25}$ = 43.0° (C = 1; N HCl).
Anal. Calcd. for C$_{22}$H$_{28}$N$_6$O$_9$.½ H$_2$O, C,H.H.

EXAMPLE 10

5-N-(L-Ornithyl-L-Leucyl)-5-Aminouridine (10)

N -CBZ-N -Nitro-L-arginine was obtained according to the procedure of Greestein and Winitz The Chemistry of the Amino Acids John Wiley and Sons, Inc., N.Y., N.Y. (1961) p. 1069 and 353 mg (1.0 mmoles) thereof together with 5-N-(L-Leucyl)-5-aminouridine (3a) (254 mg; 0.685 mmoles), N-hydroxysuccinimide (115 mg, 1.0 mmoles) and DCC (206 mg; 1.0 mmoles) was dissolved in dry DMF (3 ml) and kept at room temperature for 2 hours. After the reaction mixture was allowed to stand at 14°C for 16 hours, the dicyclochexlurea was removed by filtration and the filtrate was evaporated to dryness under reduced pressure. The residue was dissolved in 5 ml of MeOH-NH$_4$OH (conc.) 8:2, kept at room temperature for 4 hours, then was applied to preparative silica gel thin layer plates and developed with solvent system MeOH-CH$_2$Cl$_2$—NH$_4$OH (Conc.) 2:2:1. The major uv absorbing band was eluted with 80% MeOH (30 ml). The eluant was treated with 100 mg of Pd on carbon then with H$_2$ at room temperature and pressure. After 3 hours the catalyst was removed by filtration, the filtrate was evaporated to dryness, the residue was taken up with a small amount of water and lyophilized to yield 102 mg (26%) of 10, mp 81°–83°C. $[\alpha]_D^{25}$ = 17.0° (C = 1; N HCl).
Anal. Calcd. for C$_{20}$H$_{34}$N$_6$O$_8$4H$_2$O. C,H.N.

Compound 10 was hydrolyzed with 6N HCl for 8 hours at 100°C in a sealed tube. The hydrolysate was chromatographed against L-ornithine and L-leucine on silica gel CH₂Cl₂-MeOH-NH₄OH (conc.) (2:2:1) and cellulose plates (n-BuOH-AcOH-H₂O; 3:1:1.) The ninhydrin positive spots from the hydrolysate were found to be identical to L-ornithine and L-leucine.

Arginine is known to decompose to ornithine under basic conditions. Where the arginine moiety is desired in the end product, a less basic solvent may be employed in separation, e.g., butanol, ethanol, etc.

When tested for antiviral activity on KB monolayers, each of compounds 1a, 2a, 3a, 4a, 5e, 6, 9d and 10 were superior in inhibitory capability to 5-aminouridine against one or more of Herpes, Parainfluenza and Rhino viruses, while exhibiting comparatively less cytotoxicity. Compound 7, the only compound containing acidic amino acid moieties, showed no inhibitory properties in the assay employed. Commonly occurring amino acids may be grouped as follows:

| Neutral | Basic | Acidic |
|---|---|---|
| L-glycine | L-lysine | L-glutamic acid |
| L-alanine | L-arginine | L-aspartic acid |
| L-phenylalanine | L-histidine | L-tyrosine |
| L-leucine | L-tryptophan | L-hydroxyproline |
| L-isoleucine | L-ornithine | |
| L-valine | | |
| L-methionine | | |
| L-asparagine | | |
| L-glutamine | | |
| L-proline | | |
| L-serine | | |
| L-threonine | | |

It may be the case that compounds whose amino acid moieties are acidic (or Zwitter ionic) in physiological environs are for that reason less able to pass cell walls to attack the virus. In any case, 5-N-aminoacyl-5-aminouridines and 5-N-peptidyl-5-aminouridines whose amino acid moieties contain Zwitter-ion-forming functions can be used as intermediates in the formation of the active neutral or basic amino acidcontaining compounds. For example, dehydrohalogenation of L-tyrosine moieties followed by catalytic hydrogenation yields the corresponding L-phe - containing nucleoside. Zwitter ion-forming L-aspartyl or L-glutamyl moieties may by conversion of carboxyl functions to methylcarboxylates or acid chlorides followed by treatment of the same with ammonia yield the corresponding neutral L-asparaginyl and L-glutaminyl moieties, and so on.

From the foregoing, it will be apparent that by this invention there have been provided a novel class of useful nucleosidic compounds and a variety of novel procedures by which the same may be obtained. Having fully described our invention with reference to the preferred embodiments thereof, it is to be understood that the invention is not limited thereto but rather only to the lawful scope of the appended claims.

We claim:

1. 5-N-α-(L-aminoacyl)-5-aminouridine.
2. A compound according to claim 1 whose amino acid moiety is L-phenylalanyl.
3. A compound according to claim 1 whose amino acid moiety is L-alanyl.
4. A compound according to claim 1 whose amino acid moiety is L-leucyl.
5. A compound according to claim 1 whose amino acid moiety is L-glycyl.
6. A compound according to claim 1 whose amino acid moiety is L-lysyl.
7. A compound according to claim 1 whose amino acid moiety is L-asparaginyl.
8. A compound according to claim 1 whose amino acid moiety is L-glutaminyl.
9. A compound according to claim 1 whose amino acid moiety is L-aspartyl.
10. A compound according to claim 1 whose amino acid moiety is L-ornithyl.

* * * * *